United States Patent [19]
Johnson et al.

[11] Patent Number: 6,076,803
[45] Date of Patent: Jun. 20, 2000

[54] AXIAL FLOW SOLENOID VALVE

[75] Inventors: Timothy L. Johnson, Erie; Albert J. Pristera, Fairview, both of Pa.

[73] Assignee: Snap-Tite Technologies, Inc., Wilmington, Del.

[21] Appl. No.: 09/267,558

[22] Filed: Mar. 12, 1999

[51] Int. Cl.[7] .................................................. F16K 31/02
[52] U.S. Cl. .................... 251/129.22; 251/367; 335/278; 335/219
[58] Field of Search ................. 251/129.22, 129.15, 251/366, 367; 137/315; 335/255, 278, 209, 219

[56] References Cited

U.S. PATENT DOCUMENTS

| | | | |
|---|---|---|---|
| 2,922,614 | 1/1960 | Nickells | 251/129.22 X |
| 4,925,155 | 5/1990 | Carman | 251/129.22 X |
| 5,577,705 | 11/1996 | Torrence | 251/129.15 |

FOREIGN PATENT DOCUMENTS 012118  5/1911  United Kingdom .............. 251/129.22

Primary Examiner—Kevin Lee
Attorney, Agent, or Firm—Woodling, Krost & Rust

[57] ABSTRACT

A solenoid valve is disclosed which includes a solenoid assembly, an axial flow chamber and inlet and outlet housings secured to the axial flow chamber. The axial flow chamber comprises a generally cylindrically shaped inner portion and a cylindrically shaped outer portion spaced radially apart from the inner portion and connected to the inner portion by a web forming at least one passageway through the axial flow chamber. The solenoid assembly resides generally within the inner portion of the axial flow chamber and is further restrained by the inlet housing. The inlet and outlet housings are secured to the axial flow chamber.

22 Claims, 15 Drawing Sheets

AXIAL FLOW SOLENOID VALVE

FIELD OF THE INVENTION

This invention is an axial flow solenoid valve which permits the flow of gas or other fluid therethrough with very little energy loss (pressure loss). One application for the axial flow solenoid valve is in a furnace system wherein it is desired to measure or sample the combustion products of the furnace. Many other applications for the axial flow valve exist. Use of the axial flow solenoid valve enables sampling and/or measurement of the furnace exhaust without pumping the exhaust to the sampling and measurement equipment. The invention allows for the flow of fluids, when desired, through the valve with very little energy (pressure) present at the inlet housing.

BACKGROUND OF THE INVENTION

The related art includes solenoid valves which have tortuous flow paths therethrough. The tortuous paths cause energy losses in the form of pressure drops across the solenoid valves. In certain applications the pressure losses are unacceptable. Flow through a restriction is generally a function of the pressure differential across the restriction. In other words flow increases as the pressure differential across the restriction increases until some limitation is reached choking the flow.

In low inlet pressure applications, such as the furnace exhaust example given above, very little differential pressure exists and to obtain a large enough flow through the solenoid valve (the restriction) it must offer very little resistance. The instant invention provides very little resistance to the flow of fluids or gas therethrough. The terms gas and fluid are used interchangeably herein as those skilled in the art will recognize that a gas is a fluid.

SUMMARY OF THE INVENTION

An axial flow solenoid valve comprising a solenoid assembly, an axial flow chamber, an inlet housing and an outlet housing provides very little resistance to the flow of fluids therethrough. The axial flow chamber includes a generally cylindrically shaped inner portion and a cylindrically shaped outer portion spaced radially apart from the inner portion and connected thereto by a web forming at least one passageway through the axial flow chamber. Additional passageways may be formed and, indeed, the embodiments disclosed herein illustrate five passageways. Those skilled in the art however will recognize that different numbers of passageways may be employed without departing from the spirit and the scope of the invention. A solenoid assembly resides generally within the inner portion of the axial flow chamber and is further restrained by the inlet housing. The solenoid assembly includes a valve which seats against the inlet housing. An inlet housing and outlet housing are secured to the axial flow chamber. The axial flow chamber comprises a male half and a female half secured together in a tongue and groove relationship.

It is an object of the present invention to provide a high flow solenoid valve.

It is an object of the present invention to provide a solenoid valve that has very little resistance to the flow of fluid, gas or steam therethrough.

It is an object of the present invention to provide a solenoid valve having an axial flow chamber having a male half and a female half having a plurality of passageways therethrough. The male and female halves are secured together in a tongue and groove relationship and include orientation studs and receptacles for aligning the passageways therethrough.

It is an object of the present invention to provide a solenoid valve having an inlet housing and an outlet housing each secured to an axial flow chamber.

It is an object of the present invention to provide an axial solenoid valve having smooth interior contours. The inlet housing, axial flow chamber and outlet flow chamber each have smooth interior contours.

It is an object of the present invention to provide an axial flow solenoid valve having an axial flow chamber which houses: a solenoid coil wound around a bobbin, a strap, a plunger guide and plunger, and, a spring operable between the plunger guide and the plunger urging the plunger away from a stop. The axial flow chamber includes a passageway for the coil's wires to be connected to an electrical power source.

Other objects of the invention will be best understood when reference is made to the Brief Description of the Drawings, the Description of the Invention and the claims which follow hereinbelow.

BRIEF DESCRIPTION OF THE DRAWINGS

FIG. 1 is taken along the lines 1—1 of FIG. 2. The lines 1—1 represent the axis of the axial flow solenoid valve.

The drawings will be better understood when taken in conjunction with the Description of the Invention and claims which follow.

DESCRIPTION OF THE INVENTION

Figure 1:
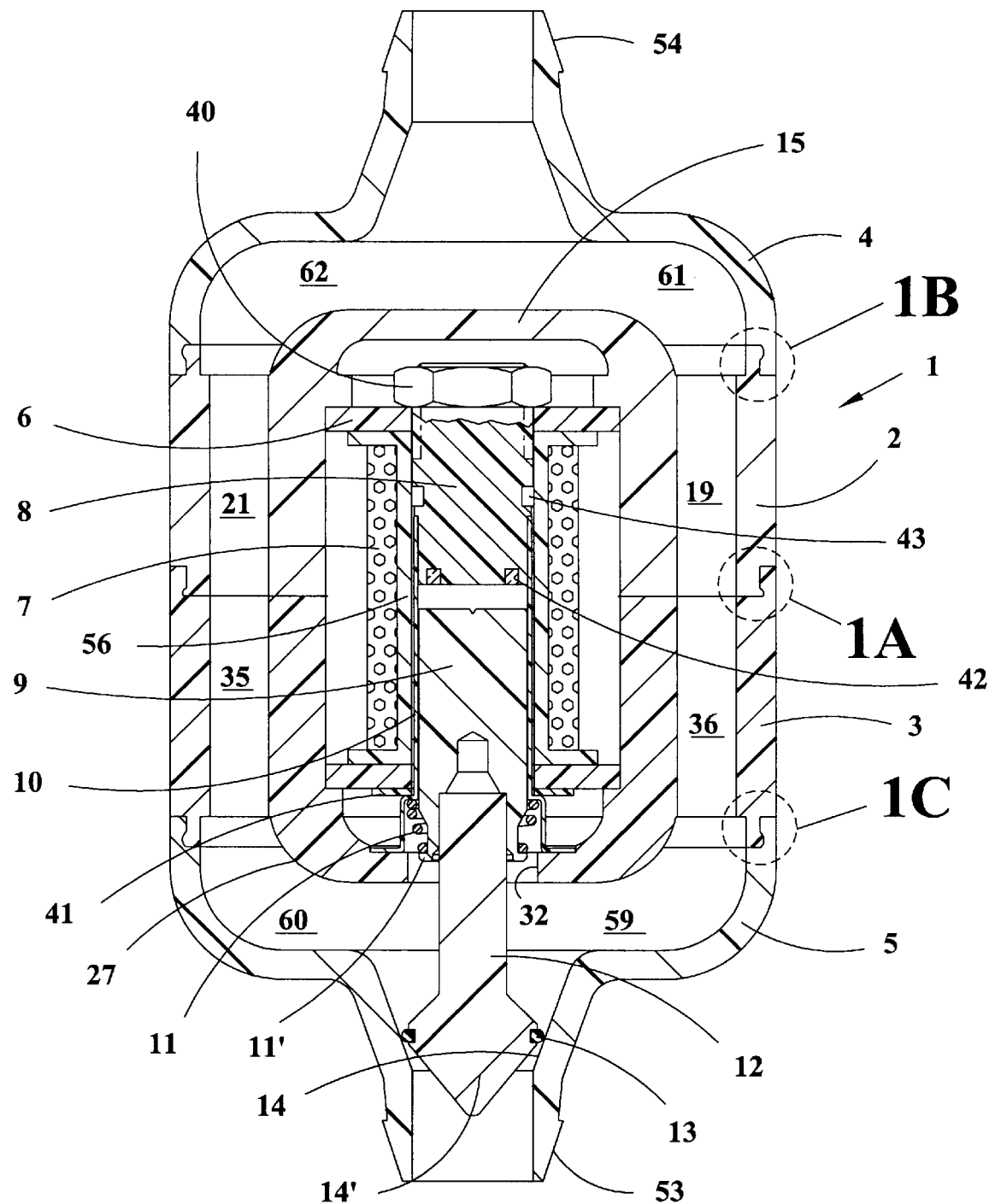
FIG. 1 is a cross-sectional view of the axial flow solenoid valve in the closed position illustrating the inlet and outlet housings and the male and female halves of the axial flow chamber.

Axial flow solenoid valve 1 is illustrated in cross-section in FIG. 1. Referring to FIG. 1, an axial flow chamber having a male half 2 and a female half 3 is illustrated. Inlet housing 4 and outlet housing 5 are also illustrated in FIG. 1. Inlet housing 4 and outlet housing 5 have smooth interior contours which tend to minimize friction losses. FIG. 1 illustrates valve 14' engaging valve seat 14 in the outlet housing. FIG. 1 illustrates the axial flow solenoid valve in its de-energized state.

Figure 1A:
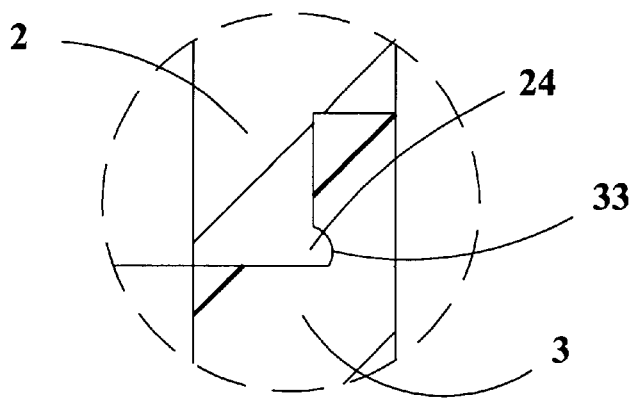
FIG. 1A is an enlarged illustration of the tongue and groove connection which secures the male half and the female half of the axial flow chamber together.

FIG. 1A illustrates the male half 2 of the axial flow chamber interconnected to the female half 3 of the axial flow chamber. Male half 2 includes a second circumferential tongue 24 which interlocks with circumferential groove 33 in the female half 3.

Figure 1B:
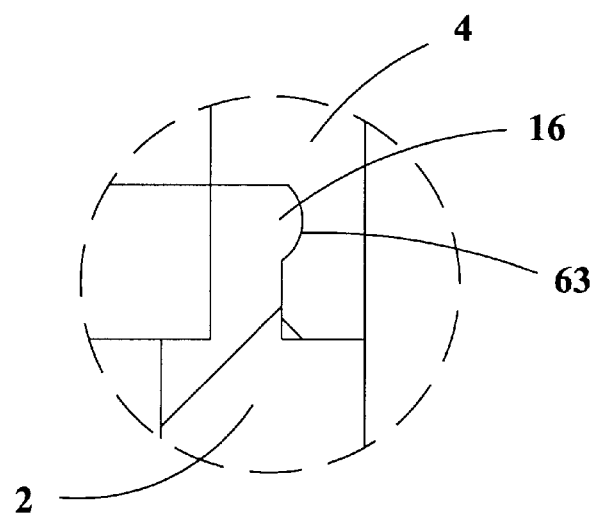
FIG. 1B is an enlarged illustration of the tongue and groove connection which secures the male half of the axial flow chamber to the inlet housing.

FIG. 1B illustrates the male half 2 of the axial flow chamber interconnected to the inlet housing 4. Male half 2 includes a first circumferential tongue 16 which interlocks with circumferential groove 63 in inlet housing 4.

Figure 1C:
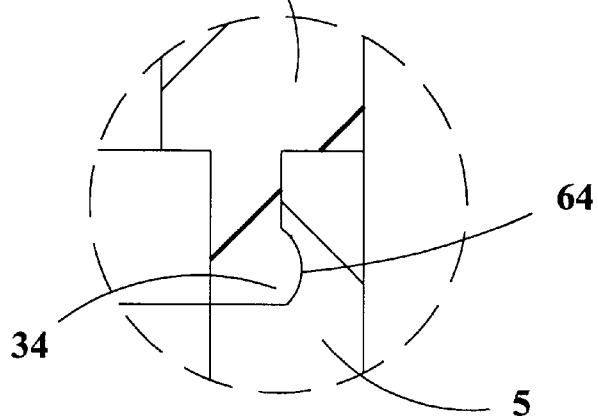
FIG. 1C is an enlarged illustration of the tongue and groove connection which secures the female half of the axial flow chamber to the outlet housing.

FIG. 1C illustrates the female half 3 of the axial flow chamber interconnected to the outlet housing 5. Circumferential tongue 34 on female half 3 engages circumferential grooves 64 in outlet housing 5 interlocking the female half 3 and the outlet housing 5 together.

Figure 2:
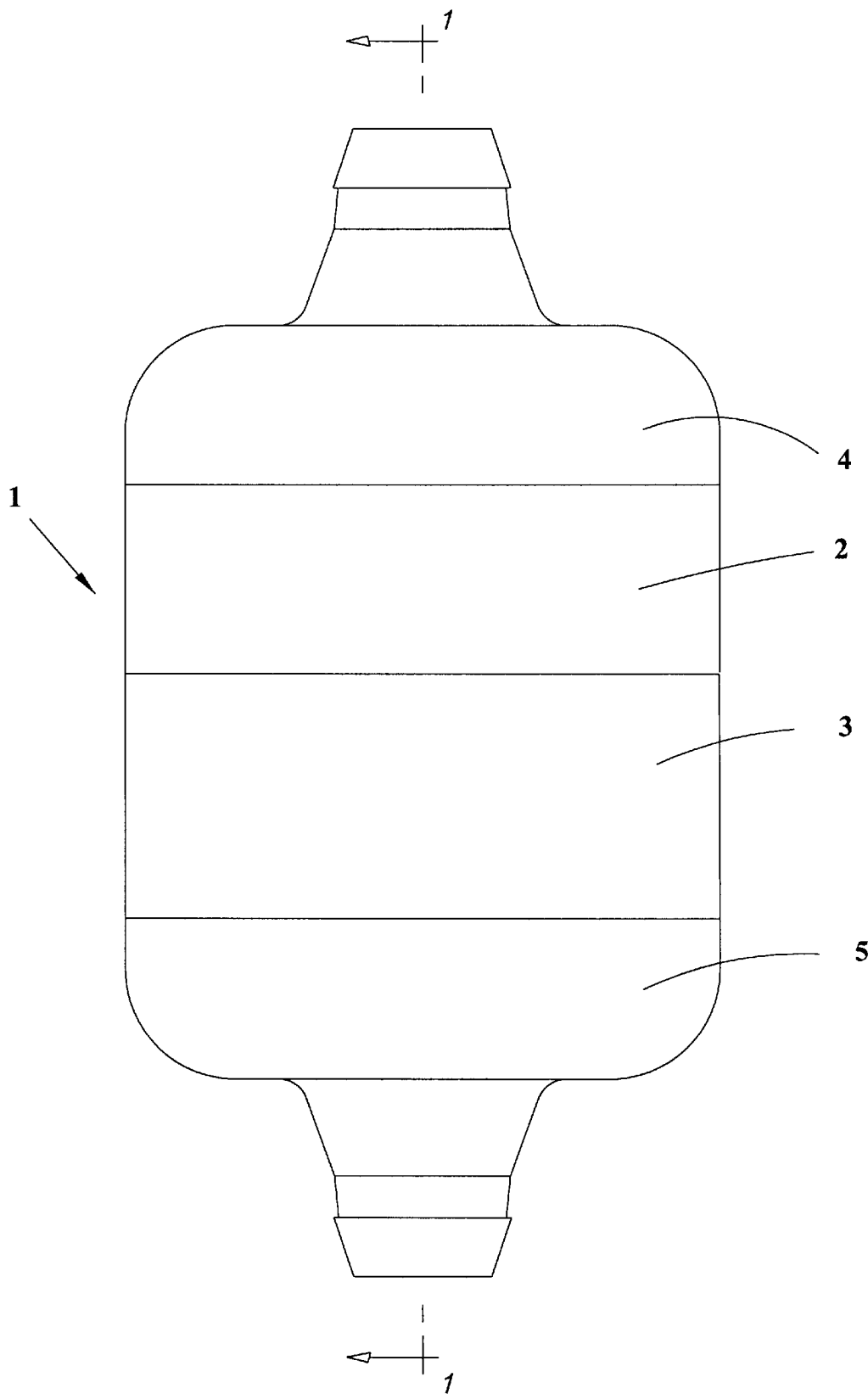
FIG. 2 is a front view of the axial flow solenoid valve.

FIG. 2 is a front view of the axial flow solenoid valve 1. FIG. 1 is a cross-sectional view taken along lines 1—1 of FIG. 2.

Referring to FIG. 1, a solenoid assembly is illustrated comprising strap 6, solenoid coil 7, stop 8, plunger 9, guide 10, spring 11, plunger extension 12, and bobbin 56. Plunger extension 12 includes a valve 14' and a seal 13. The seal 13 is an elastomeric seal and seals against valve seat 14 on outlet housing 5. Plunger extension 12 is press fit into plunger 9. Those skilled in the art will recognized that plunger extension 12 and plunger 9 could, if desired, be made from one piece. Plunger 9 includes a shoulder 11' thereon and spring 11 operates between the guide 10 and the plunger shoulder 11'.

Male half 2 of the axial flow chamber includes a closed end 15. Female half 3 of the axial flow chamber includes a crown 27 which has an opening 32 to allow the plunger 9 and the plunger extension 12 to move within the opening 32. Still referring to FIG. 1, the first flow passageway 36 in the female half 3 of the axial flow chamber communicates with the first flow passageway 19 in the male half 2 of the axial flow chamber. Similarly the third flow passageway in the female half 3 of the axial flow chamber communicates with the third flow passageway 21 in the male half 2 of the axial flow chamber. Inlet housing 4 includes a smoothly contoured inlet flow path 61 and a smoothly contoured inlet flow path 62. Outlet housing 5 includes a smoothly contoured outlet flow path 59 and a smoothly contoured flow path 60.

Still referring to FIG. 1, the solenoid assembly includes a nut 40 threaded on stop 8. Stop 8 includes shading band 42. Washer 41 is interposed between guide 10 and strap 6.

Inlet housing 4 includes a barbed connection 54 and outlet housing 5 includes a barbed connection 53. The barbed connections enable hoses and/or tubing to be more readily connected.

Figure 3:
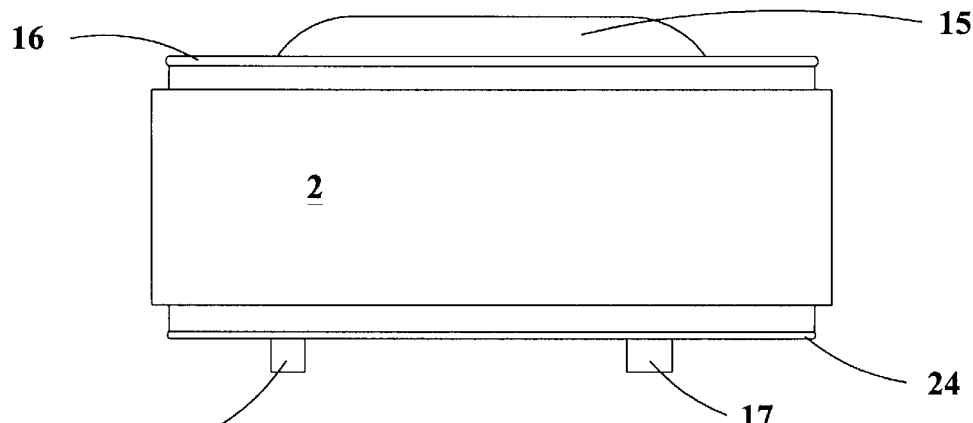
FIG. 3 is a front view of the male half of the axial flow chamber of the axial flow solenoid valve.

FIG. 3 is a front view of the male half 2 of the axial flow chamber of the axial flow solenoid valve. FIG. 3 illustrates a large diameter alignment stud 17 and a small diameter alignment stud 18. The first circumferential tongue 16 and the second circumferential tongue 24 are also illustrated in FIG. 3. FIG. 3 also illustrates the closed end 15 thereof.

Figure 4:
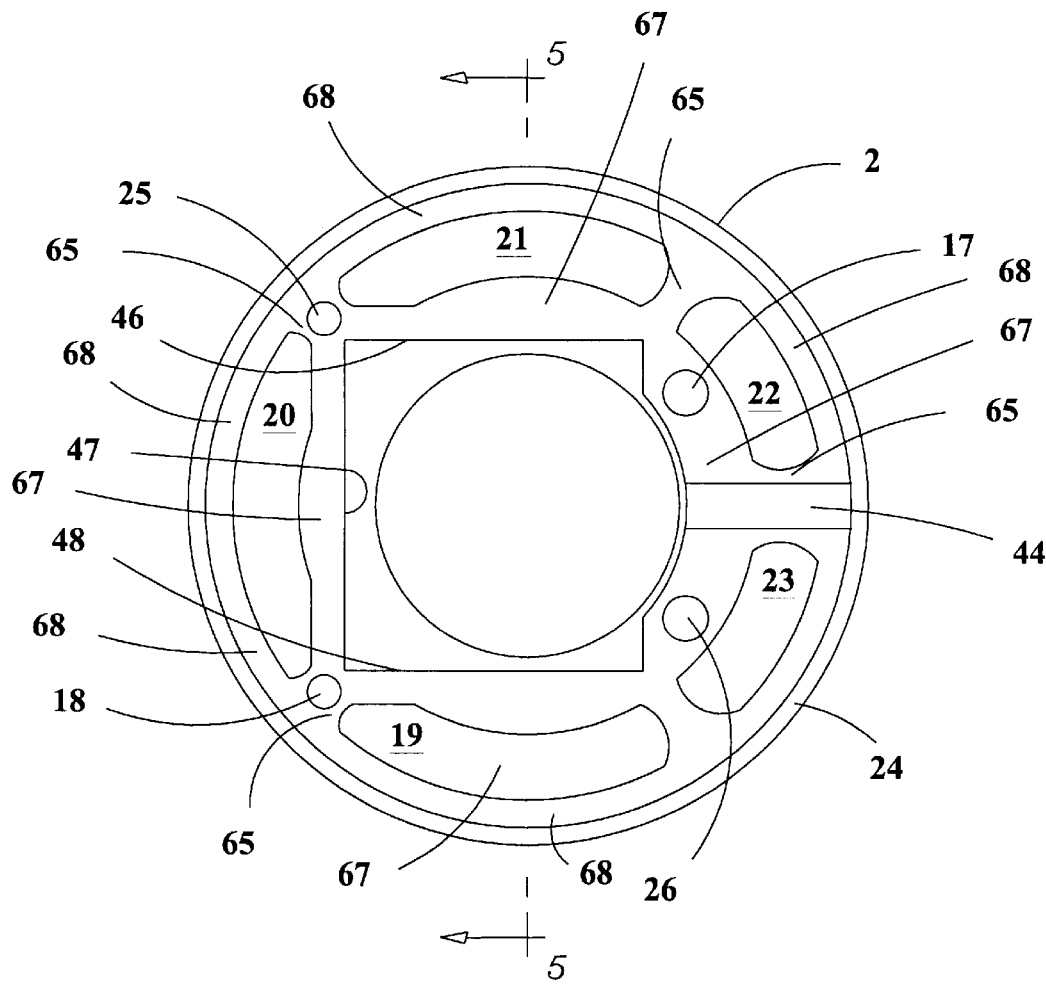
FIG. 4 is a bottom view of the male half of the axial flow chamber of the axial flow solenoid valve.

FIG. 4 is a bottom view of the male half 2 of the axial flow chamber of the axial flow solenoid valve. FIG. 4 also illustrates studs 17 and 18. A small diameter alignment receptacle 25 and a large diameter alignment receptacle 26 are shown in FIG. 4. The first flow passageway 19, second flow passageway 20, third flow passageway 21, fourth flow passageway 22, and fifth flow passageway 23 are illustrated in the male half 2 of the axial flow chamber in FIG. 4. Additionally passageway 44 for routing the coil wires is shown in FIG. 4.

Figure 5:
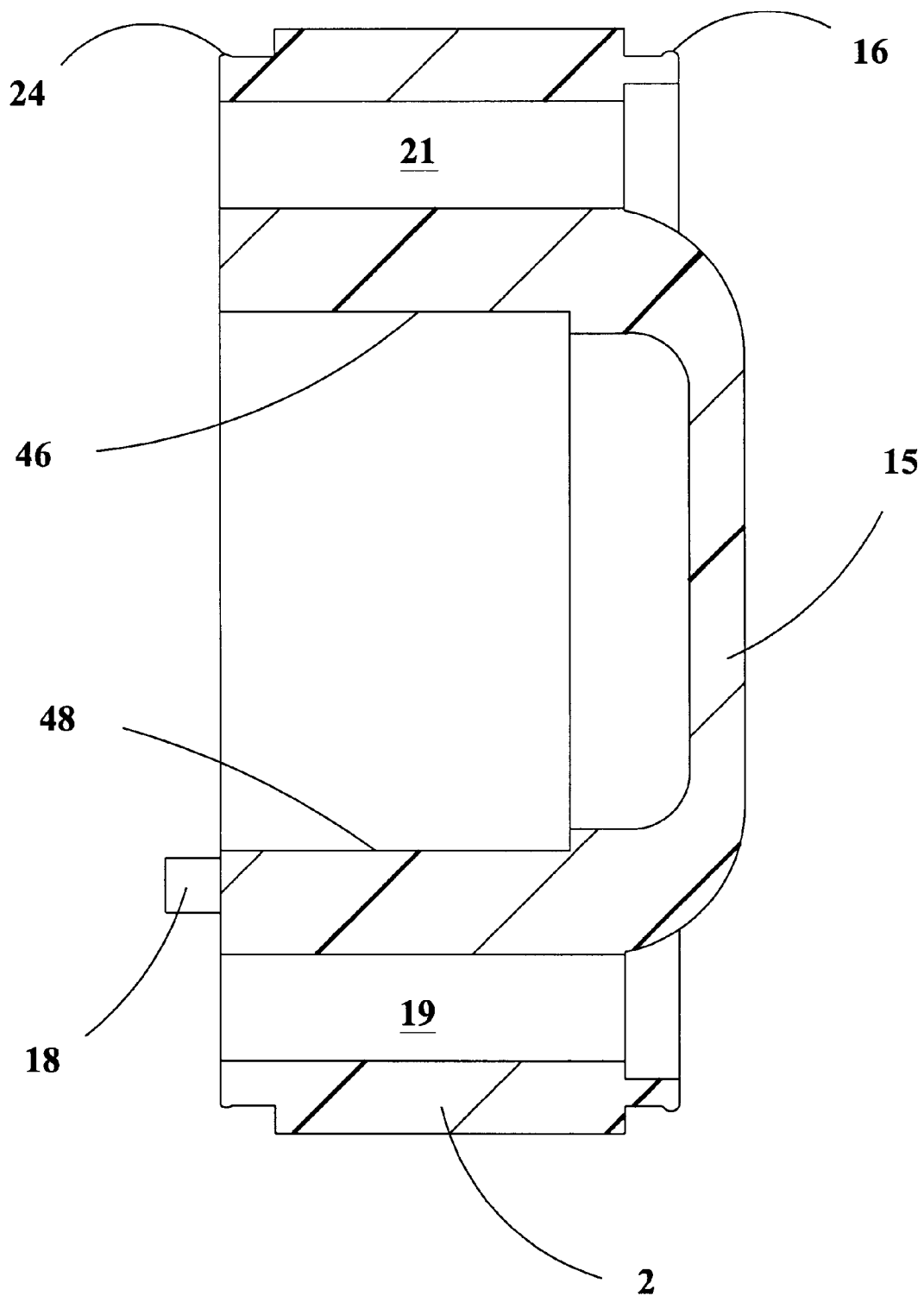
FIG. 5 is a cross-sectional view of the male half of the axial flow chamber of the axial flow solenoid valve taken along the lines 5—5 of FIG. 4.
Figure 16:
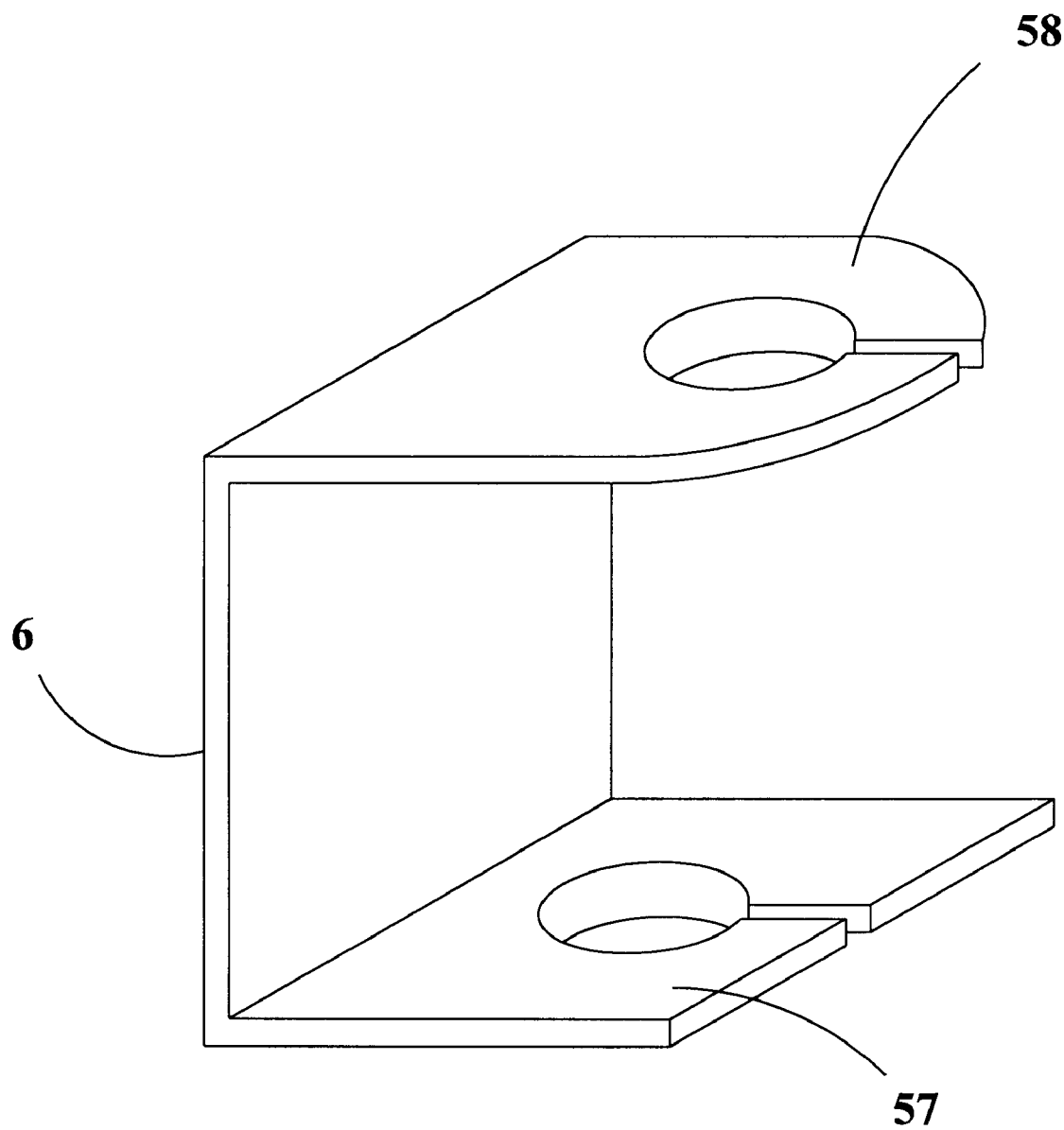
FIG. 16 is a perspective view (not to scale) of the strap which interfits with the male and female halves of the axial flow chamber.

FIG. 5 is a cross-sectional view of the male half of the axial flow chamber of the axial flow solenoid valve taken along the lines 5—5 of FIG. 4. FIG. 5 illustrates in cross section the first passageway 19 and the third passageway 21 in the male half 2. One of the alignment studs is also shown as are the circumferential tongues 24 and 16. The first wall 46 and the third wall 48 support the strap 6. FIG. 16 is a perspective view of the strap. The strap interfits with the male and female halves of the axial flow chamber.

Figure 6:
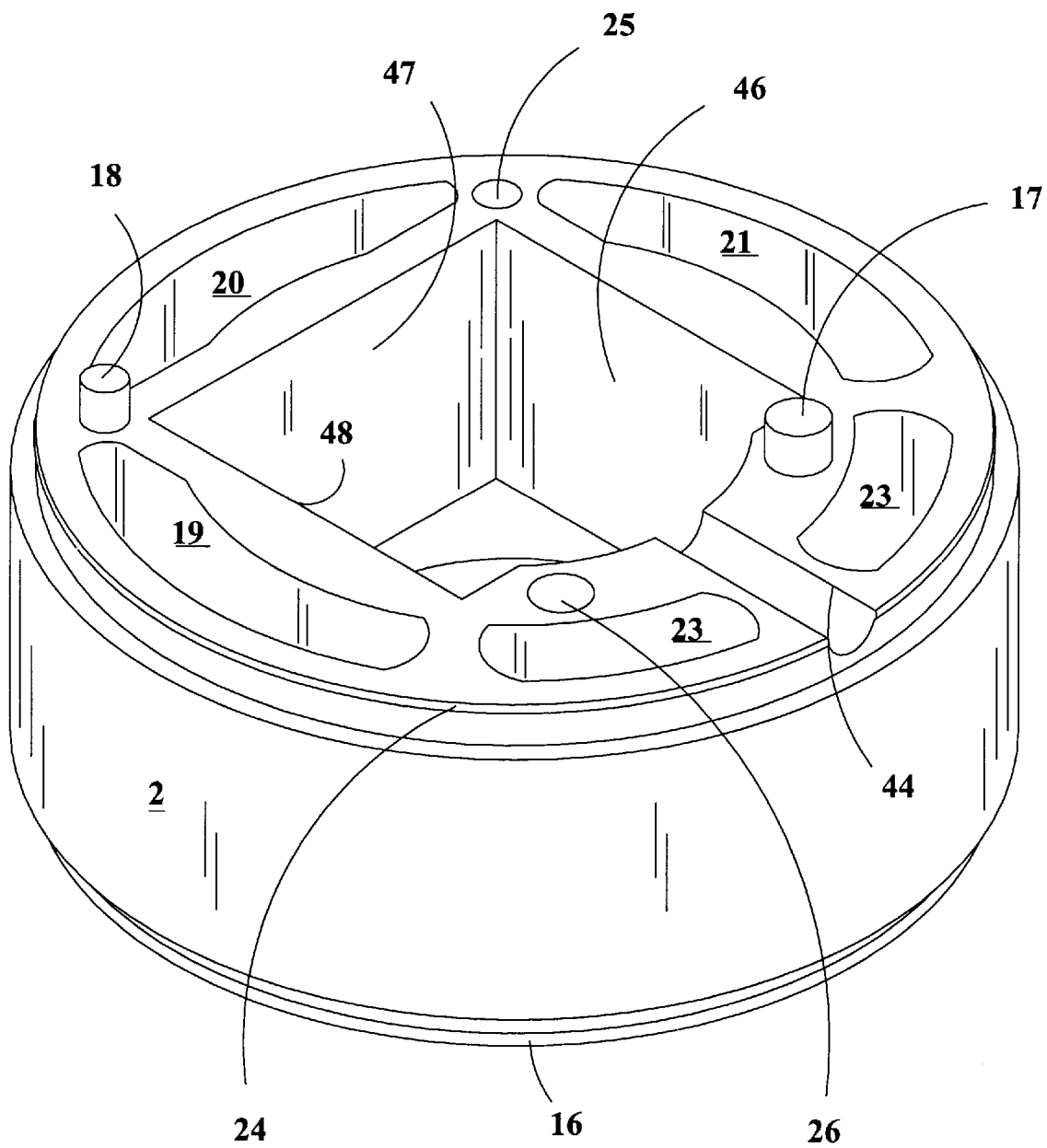
FIG. 6 is a bottom-side perspective view of the male half of the axial flow chamber.
Figure 7:
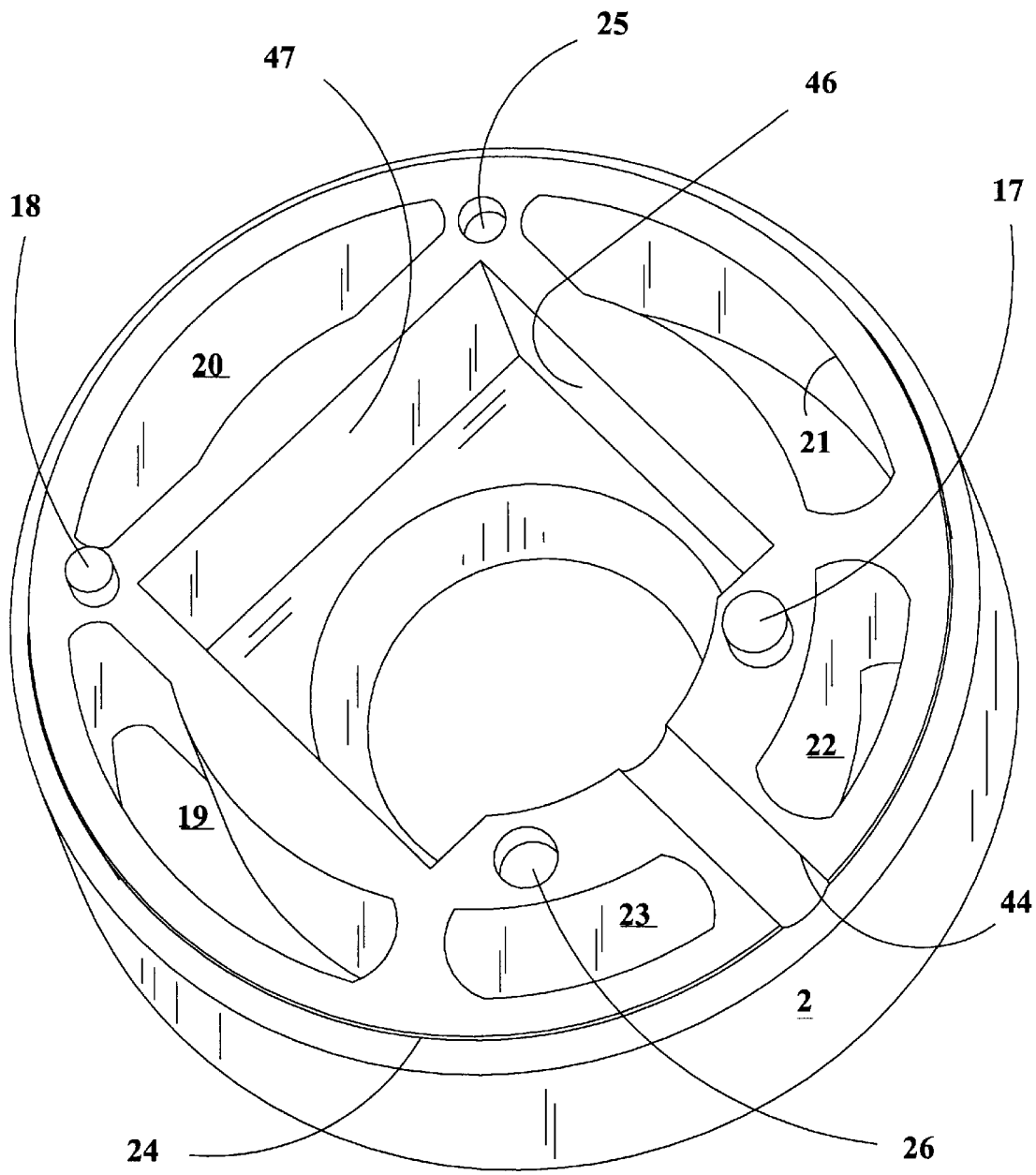
FIG. 7 is another bottom-side perspective view of the male half of the axial flow chamber.

FIG. 6 is a bottom-side perspective view of the male half 2 of the axial flow chamber. Second wall 47 in the male half 2 also supports the strap 6. FIG. 7 is another bottom-side perspective view of the male half of the axial flow chamber. FIG. 6 and FIG. 7 illustrate the passageways 19, 20, 21, 22 and 23.

Figure 8:
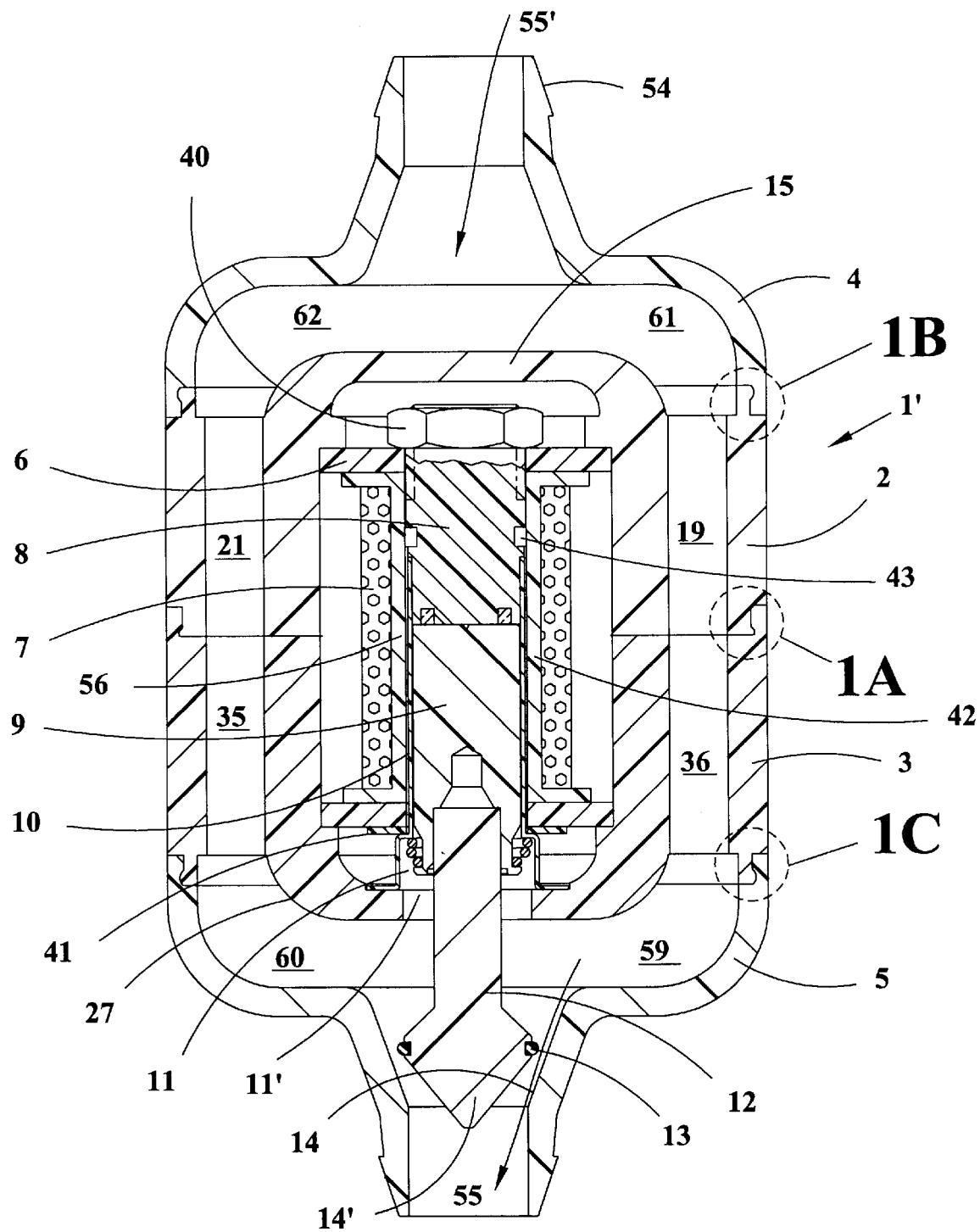
FIG. 8 is a cross-sectional view of the axial flow solenoid valve in the open position.

FIG. 8 is a cross-sectional view of the axial flow solenoid valve in the open position. Reference numeral 55 is a flow arrow illustrating the flow of fluid past the valve 14' and reference numeral 55' is a flow arrow illustrating the flow of fluid into the inlet housing 4. FIG. 8 illustrates the condition when coil 7 is energized. Coil 7 may either be an AC coil or a DC coil. Shading band 42 accommodates and attenuates AC buzz. Reference numeral 43 indicates a circumferential space.

Figure 9:
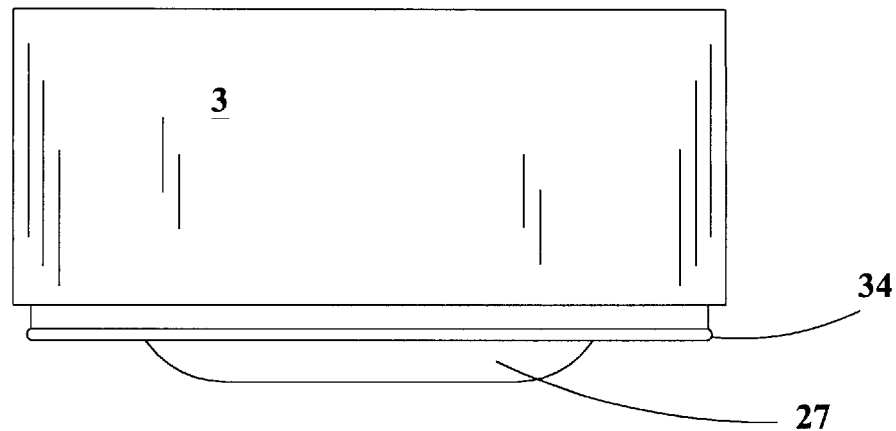
FIG. 9 is a front view of the female half of the axial flow chamber of the axial flow solenoid valve.

FIG. 9 is a front view of the female half of the axial flow chamber of the axial flow solenoid valve. FIG. 9 illustrates the crown 27 on the female half 3 as well as the circumferential tongue 34 of the female half 3.

Figure 10:
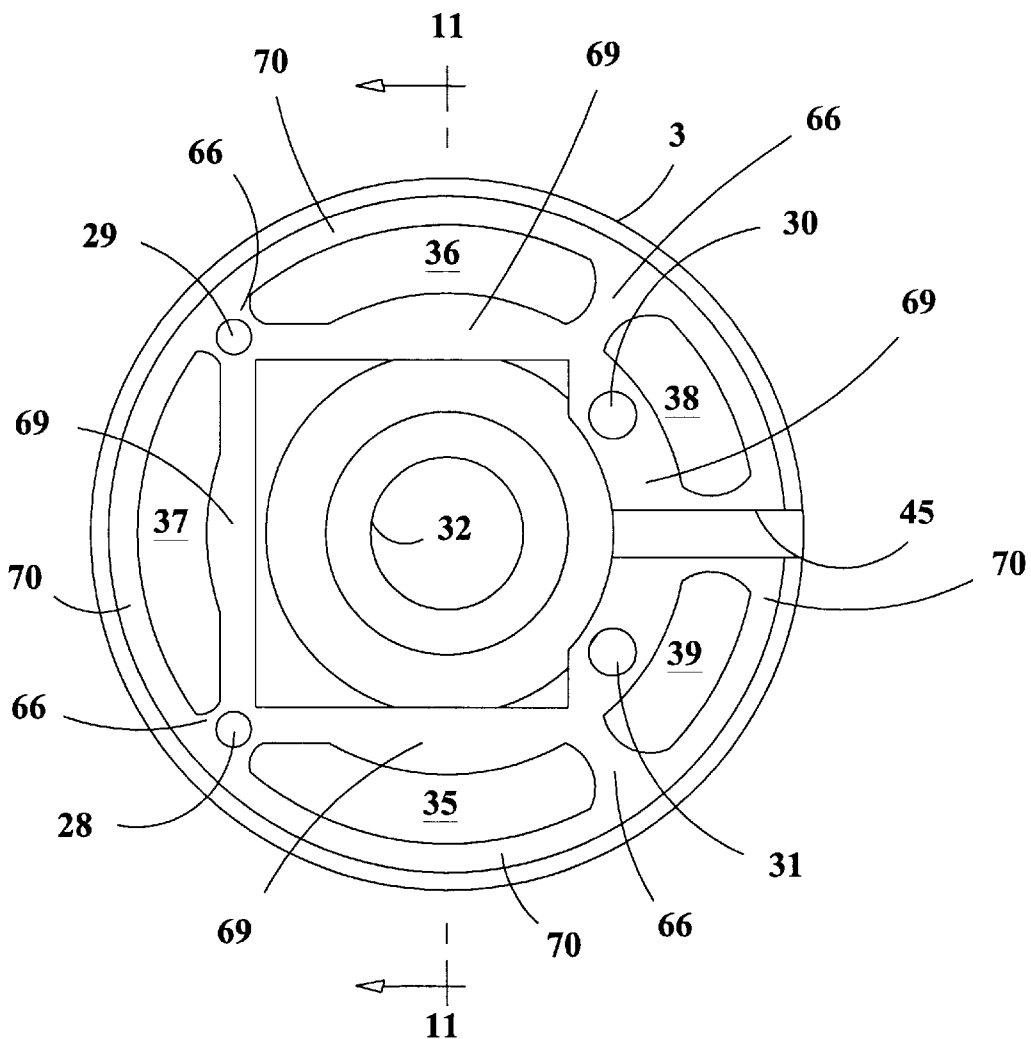
FIG. 10 is a top view of the female half of the axial flow chamber of the axial flow solenoid valve.

FIG. 10 is a top view of the female half 3 of the axial flow chamber of the axial flow solenoid valve. Small diameter alignment stud 28 and large diameter alignment stud 30 are shown in FIG. 10 as are the small alignment receptacle 29 and the large alignment receptacle 31. FIG. 10 also illustrates the first flow passageway 36, second flow passageway 37, third flow passageway 35, fourth flow passageway 39, and fifth flow passageway 38 in the female half 3 of the axial flow chamber.

Reference numeral 45 is the passageway for the coil wires in the female half 3. Reference 32 is the opening for the plunger 9 and the plunger extension 12 as previously stated above.

Figure 11:
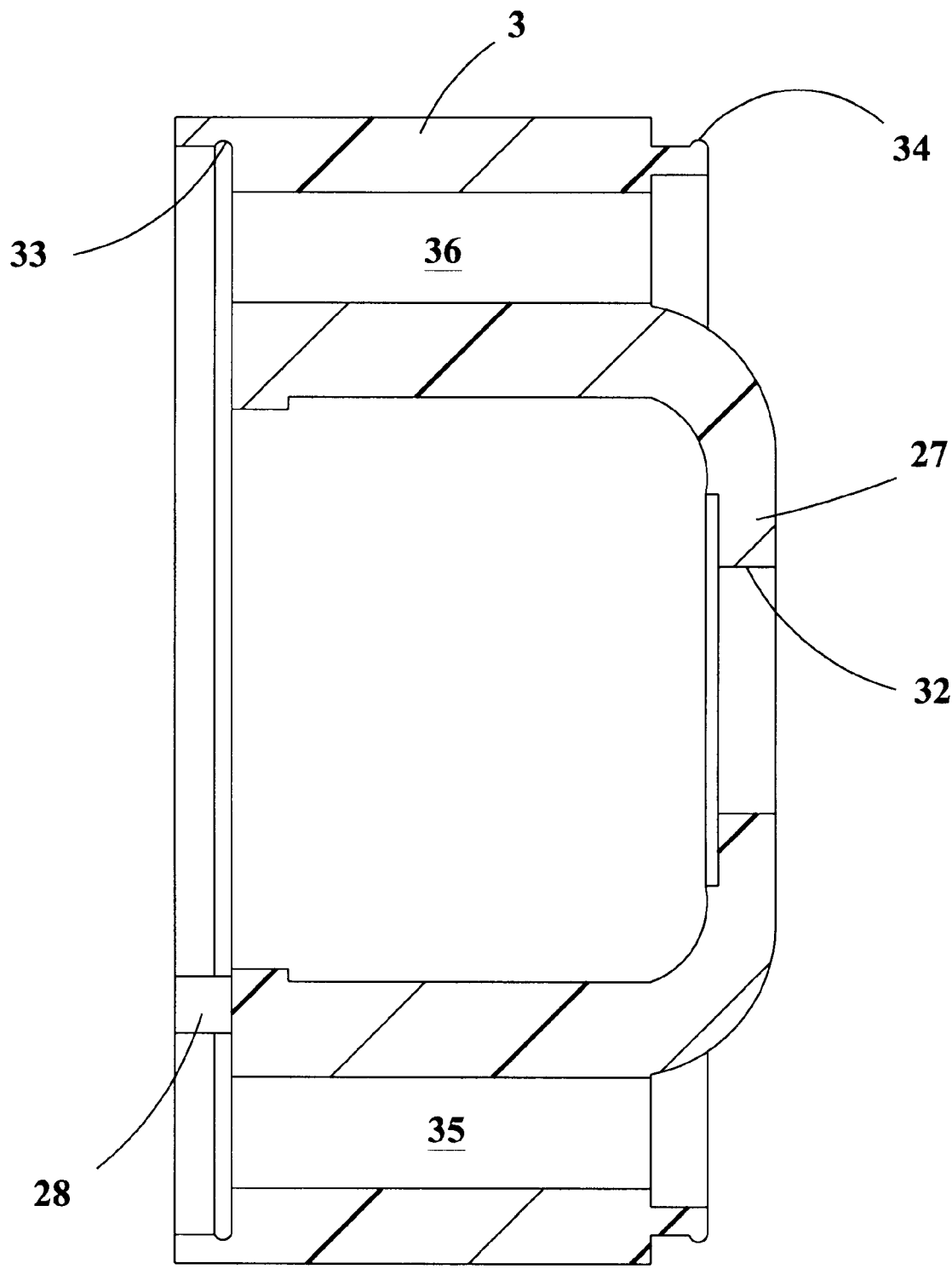
FIG. 11 is a cross-sectional view of the female half of the axial flow chamber of the axial flow solenoid valve taken along the lines 11—11 of FIG. 10.

FIG. 11 is a cross-sectional view of the female half of the axial flow chamber of the axial flow solenoid valve taken along the lines 11—11 of FIG. 10. FIG. 11 illustrates in cross section the first flow passageway 36 and the third flow passageway 35. Circumferential tongue 34 and groove or recess 33 are also shown in FIG. 11. Small diameter alignment stud 28 is also shown in FIG. 11.

Figure 12:
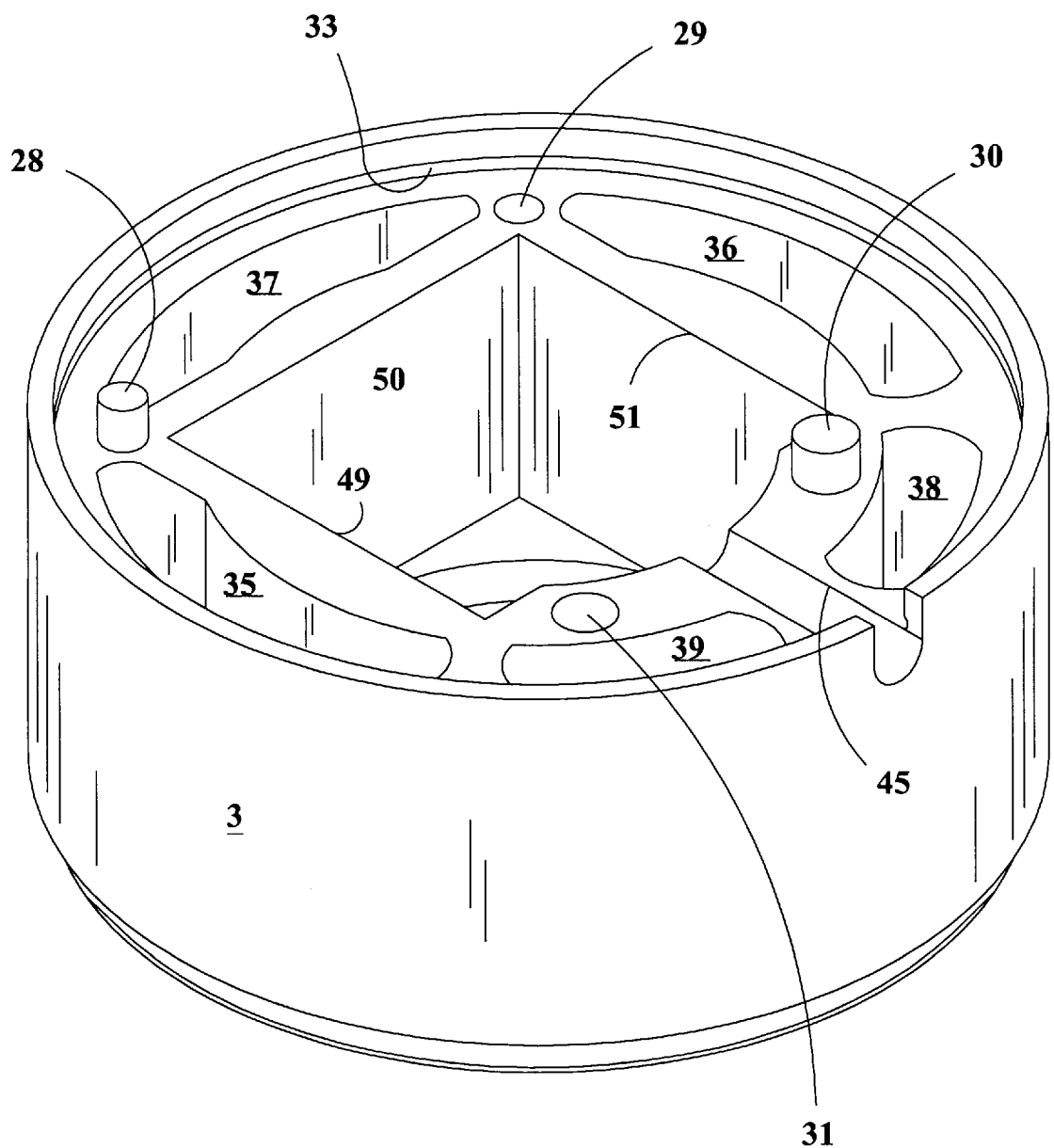
FIG. 12 is a top-side perspective view of the female half of the axial flow chamber of the axial flow solenoid valve.

FIG. 12 is a top-side perspective view of the female half of the axial flow chamber of the axial flow solenoid valve. First wall 49, second wall 50, and third wall 51 support strap 6.

Figure 13:
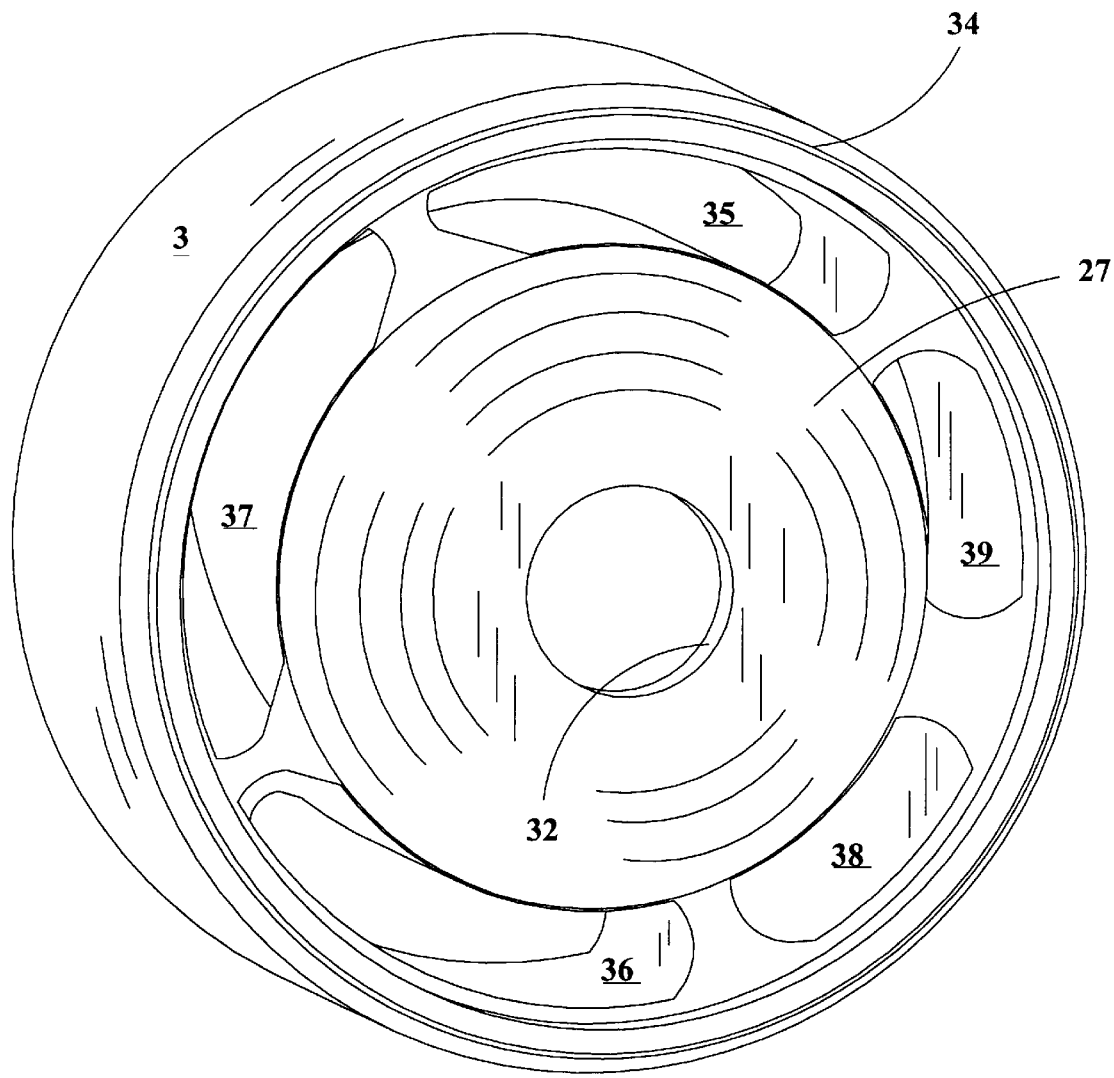
FIG. 13 is a bottom-side perspective view of the female half of the axial flow chamber of the axial flow solenoid valve.

FIG. 13 is a bottom-side perspective view of the female half of the axial flow chamber of the axial flow solenoid valve. Flow passageways 35, 39, 38, 36, and 37 are also illustrated in FIG. 13 as is the circumferential tongue 34.

FIG. 16 illustrates the strap 6 and further illustrates the male half base 57 and the female half base 58.

Referring again to FIG. 1, male half 2 and female half 3 are illustrated as being secured together to form the axial flow chamber. It is necessary that the passageways of the male and female halves of the axial flow chamber align. The small diameter alignment stud 18 and the large diameter alignment stud 17 respectively engage the small diameter alignment receptacle 29 and the large diameter alignment receptacle 31 of the female half 3 of the axial flow chamber. Similarly the small diameter alignment stud 28 and the large diameter alignment stud 30 of the female half respectively engage the small diameter alignment receptacle 25 and the large diameter receptacle 26 of the male half 2. See FIGS. 6 and 12. The first flow passageway 19 in the male is then aligned with the first flow passageway 36, the second flow passageway 20 in the male is then aligned with the second flow passageway 37 in the female, the third flow passageway 21 in the male is then aligned with the third flow passageway 35 in the female, the fourth low passageway 22 in the male is then aligned with the fourth flow passageway 39 in the female, and the fifth flow passageway 23 in the male is then aligned with the fifth flow passageway 38 in the female. The first passageway 19 of the male half communicates with the first passageway 36 of the female half, the second passageway 20 of the male communicates with the second passageway 37 of the female, the third passageway 21 of the male communicates with the third passageway 35 of the female, the fourth passageway 22 of the male communicates with the fourth passageway 39 of the female, and the fifth passageway 23 of the male communicates with the fifth passageway 38 of the female. Those skilled in the art will readily recognize that any number of flow passageways could be employed without departing from the spirit and scope of the invention.

Referring to FIG. 4, reference numeral 65 represents a web between an inner portion 67 of the male half and an outer portion 68 of the male half of the axial flow chamber. Referring to FIG. 10 reference numeral 66 represents a web in the female half of the axial flow chamber which interconnects an inner portion 69 of the female half to an outer portion 70 of the female half of the axial flow chamber.

Referring to FIG. 1, the solenoid assembly is generally housed within the male and female halves of the axial flow chamber. The valve 14' and the plunger extension 12 protrude outside the axial flow chamber. The male and female halves of the axial flow chamber form a cylindrical outer portion.

Figure 14:
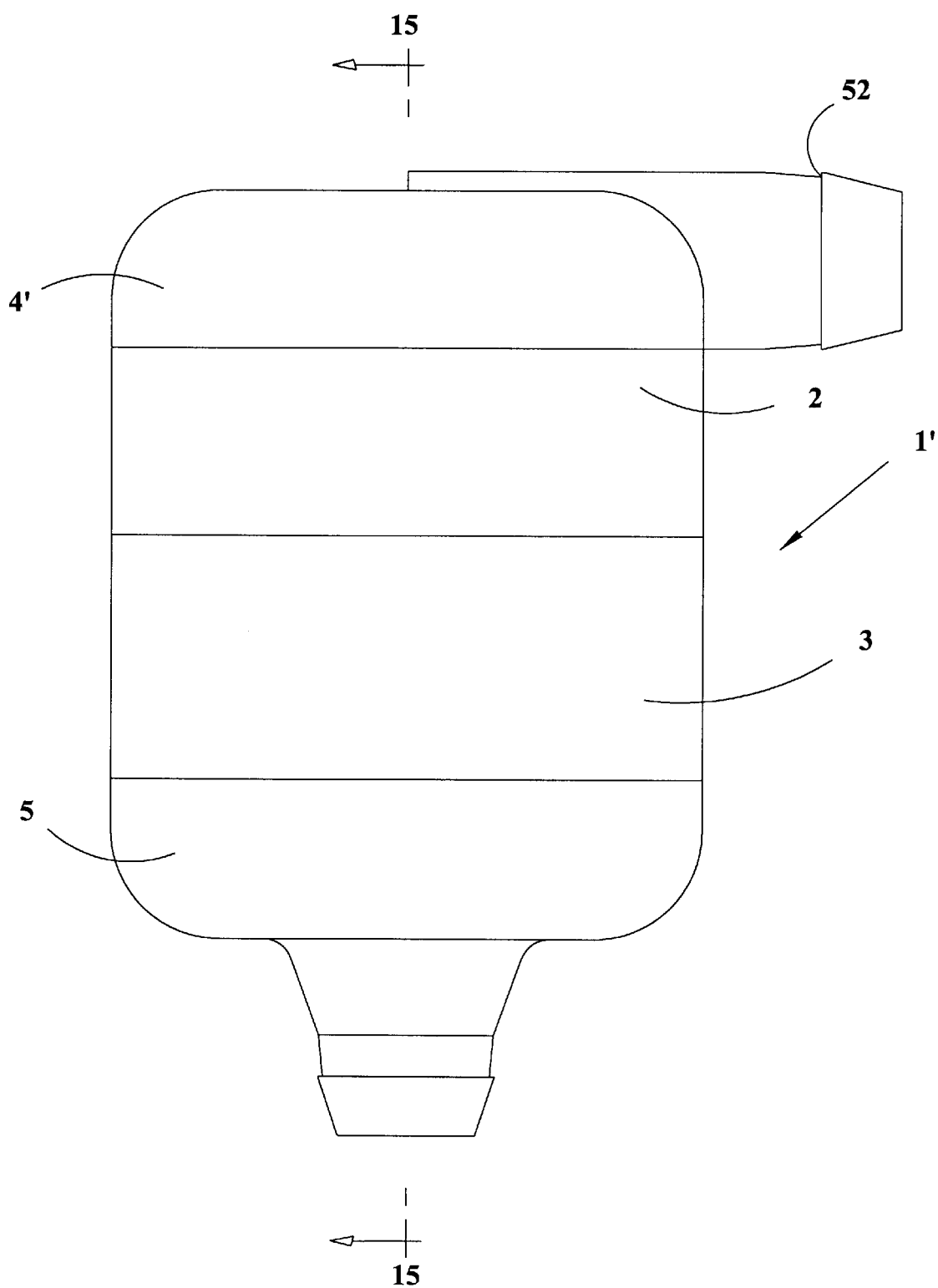
FIG. 14 is a front view of another embodiment of the invention illustrating an inlet housing which approaches at a 90° angle to the axis of the solenoid valve.

FIG. 14 is a front view of another embodiment of the invention illustrating an inlet housing with approaches at a 90° angle to the axis of the solenoid. The axis of the solenoid valve is generally taken along the lines 15—15 of FIG. 14. Reference numeral 1' illustrates the embodiment which includes an inlet housing whose gas flow approaches at a 90° angle with respect to the axis of the axial flow solenoid valve. Barbed connection 52 on outlet housing 4' enables easy connection to a hose or tubing.

Figure 15:
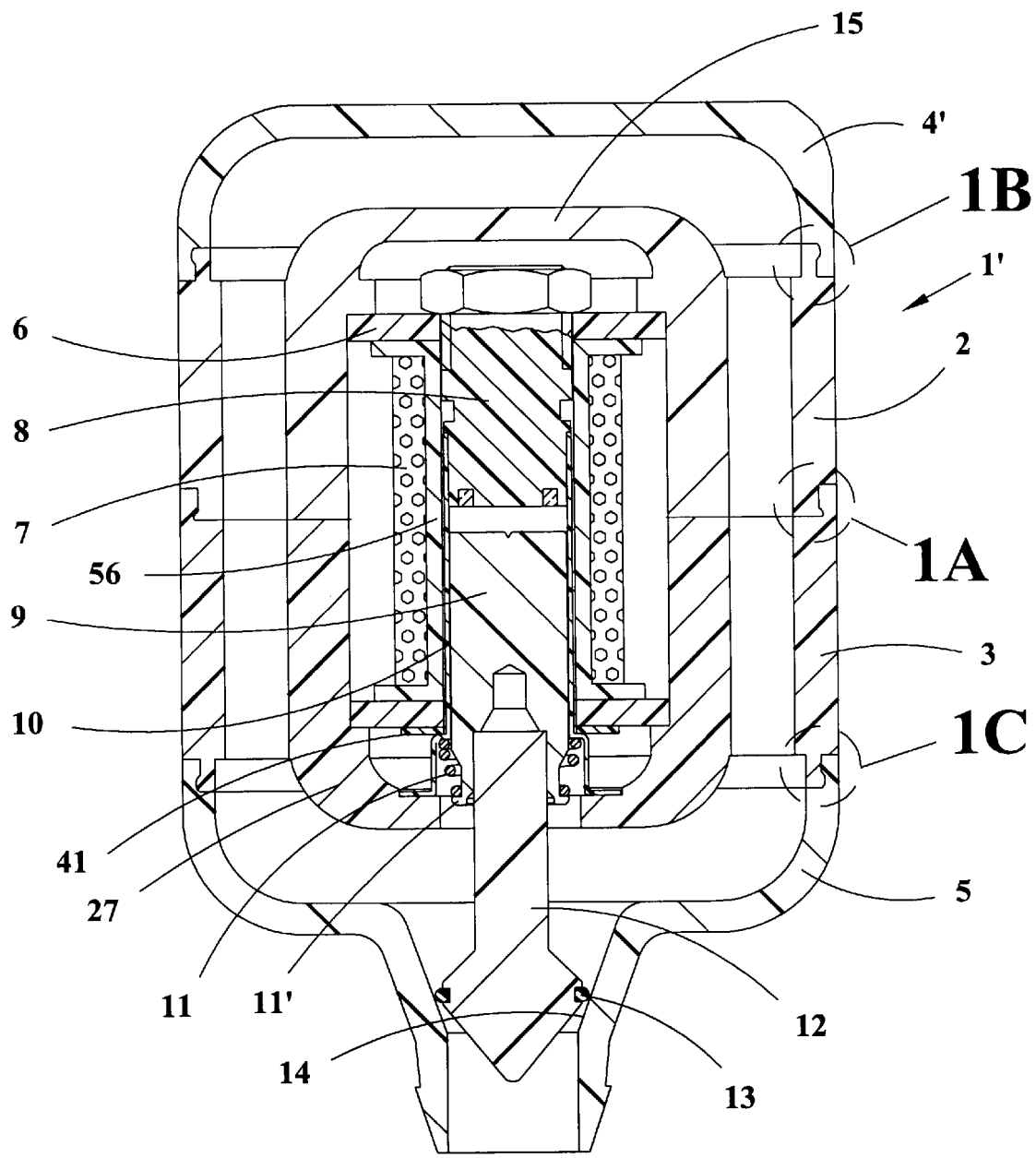
FIG. 15 is a cross-sectional view of the axial flow solenoid valve taken along the lines 15—15 of FIG. 14.

FIG. 15 is cross-sectional view of the axial flow solenoid valve taken along the lines 15—15 of FIG. 14. The valve is shown in its closed position in FIG. 15.

The invention provides for flow with very little pressure loss. The flow area of the passageways is at least 5 times the area of the flow passageway between valve 14' and inlet housing 4 as shown in FIG. 8.

The preferred material of the inlet housing, outlet housing, male half of the axial flow chamber, and the female half of the axial flow chamber is plastic. The valve 14' is preferably plastic. The solenoid assembly is comprised of a magnetic steel stop 8 and a magnetic stainless steel plunger 9.

The invention disclosed herein has been set forth by way of example only. Those skilled will readily recognize that many changes can be made to the invention disclosed without departing from the spirit and scope of the claims which are appended hereto.

We claim:

1. A solenoid comprising a first axial flow chamber; a second axial flow chamber; each of said axil flow chambers includes a generally cylindrically shaped inner portion and a generally cylindrically shaped outer portion spaced radially apart from the inner portion; a web connecting each of said inner and outer portions of said chambers together forming at least one passageway through said chambers; and a solenoid assembly residing within said first and second axial flow chambers.

2. A solenoid as claimed in claim 1 wherein said solenoid assembly includes a coil, a bobbin, a plunger, a stop and plunger guide.

3. A solenoid as claimed in claim 1 wherein said axial flow chambers are secured together.

4. A solenoid as claimed in claim 2 including a passageway formed in said axial flow chambers to permit energy to be supplied to said coil.

5. A solenoid as claimed in claim 1 wherein said first axial flow chamber is internally closed and said second axial flow chamber is internally open.

6. A solenoid valve comprising an axial flow chamber and a solenoid assembly residing within said axial flow chamber; said axial flow chamber includes a generally cylindrically shaped inner portion and a generally cylindrically shaped outer portion spaced radially apart from the inner portion; a web connecting said inner and outer portions of said chambers together forming at least one passageway through said chamber; an inlet and an outlet; a valve affixed to said solenoid assembly and operable therewith permitting flow through said inlet, said axial flow chamber and said outlet when said solenoid is energized.

7. A solenoid valve as claimed in claim 6 wherein said axial flow chamber includes a female half and a male half secured together; and, said inlet is secured to said male half of said axial flow chamber and said outlet is secured to said female half of said axial flow chamber.

8. A solenoid valve as claimed in claim 7 wherein said axial flow chamber includes at least two axial passageways.

9. A solenoid valve as claimed in claim 7 wherein said axial passageways are parallel to each other and to the axis of said solenoid assembly.

10. A solenoid valve as claimed in claim 6 wherein said axial flow chamber includes passageway having an area at least 5 times the area of said inlet.

11. A solenoid valve as claimed in claim 7 wherein said female half includes a groove and said male half includes a tongue; and, said tongue of said male half engages said groove of said female half securing said male half and female half together.

12. A solenoid valve as claimed in claim 11 wherein said female half includes a passageway and said male half includes a passageway; said female half includes an alignment pin and an alignment receptacle and said male half includes an alignment pin and an alignment receptacle; and, said alignment pin of said male half engaging said alignment receptacle of said female half and said alignment pin of said female half engaging said alignment receptacle of said male half preventing rotation of said male half and said female halves assuring alignment of said passageway of said male half with said passageway of said female half.

13. A solenoid valve as claimed in claim 12 wherein said male half, said female half, said inlet and said outlet are made of plastic.

14. A solenoid valve comprising: a solenoid assembly including a valve and a plunger assembly movable upon energization and deenergization of said solenoid assembly; an inlet housing; a female half of an axial flow chamber; an outlet housing; a male half of an axial flow chamber; each of said axial flow chambers includes a generally cylindrically shaped inner portion and a generally cylindrically shared outer portion spaced radially apart from the inner portion; a web connecting each of said inner and outer portions of said chambers together forming at least one passageway through said chambers; said male and female halves of said axial flow chamber secured to each other and said inlet housing secured to said female half of said axial flow chamber and said outlet housing secured to said male half of said axial flow chamber; and, said valve engages said outlet housing when said solenoid assembly is deenergized.

15. A solenoid valve assembly as claimed in claim 14 wherein said solenoid assembly includes an axis; said male and female halves of said axial flow chamber each include a passageway circumferentially spaced radially from said solenoid assembly and parallel to said axis of said solenoid assembly.

16. A solenoid valve as claimed in claim 15 wherein said male half of said female half include a plurality of passageways circumferentially spaced radially from said solenoid assembly and parallel to said axis of said assembly.

17. A solenoid valve as claimed in claim 16 further comprising means for aligning said passageways of said male and female halves of said axial flow chamber.

18. A solenoid valve as claimed in claim 17 wherein said male half includes a tongue and said female half includes a groove for receiving said tongue thereby securing said male half to said female half.

19. A process for making a solenoid valve having a solenoid assembly having a plunger and a valve movable therewith, an inlet housing, an outlet housing, and an axial flow chamber having a male half and a female half, comprising the steps of:

inserting said solenoid assembly into said female half of said axial flow chamber;

securing said male half of said axial flow chamber to said female half of said axial flow chamber thereby securing said solenoid assembly;

securing said outlet housing to said female half of said axial flow chamber thereby restraining said plunger and said valve;

and, securing said inlet housing to said male half of said axial flow chamber.

20. A solenoid valve comprising: a solenoid assembly, an axial flow chamber, an inlet housing and an outlet housing; said axial flow chamber comprises a generally cylindrically shaped inner portion and a cylindrically shaped outer portion spaced radially apart from said inner portion and connected thereto by a web forming at least one passageway through said axial flow chamber; said solenoid assembly residing generally within said inner portion of said axial flow chamber and being further restrained by said outlet housing; and, said inlet and outlet housings secured to said axial flow chamber.

21. A solenoid valve as claimed in claim 20 wherein said inlet and outlet housings include grooves and said axial flow chamber includes tongues for engaging said grooves securing said housings to said axial flow chamber.

22. A solenoid valve as claimed in claim 21 wherein said axial flow chamber includes a male half and a female half, said male half includes a tongue, and said female half includes a groove, and said tongue of said male engages said groove of said female thereby securing said halves together.

* * * * *

UNITED STATES PATENT AND TRADEMARK OFFICE
CERTIFICATE OF CORRECTION

PATENT NO. : 6,076,803
DATED : June 20, 2000
INVENTOR(S) : Timothy L. Johnson, et al.

It is certified that error appears in the above-identified patent and that said Letters Patent is hereby corrected as shown below:

Column 5,
Line 30, delete "low", and insert --flow--

Column 6,
Line 7, delete "4", and insert --5--.
Line 20, delete "axil", and insert --axial--.
Line 33, after "solenoid", insert --assembly--.
Line 36, after "solenoid", insert --valve--.

Column 7,
Line 22, delete "shared", and insert --shaped--.

Signed and Sealed this

Seventeenth Day of July, 2001

Attest:

NICHOLAS P. GODICI
Attesting Officer
Acting Director of the United States Patent and Trademark Office